United States Patent
Timpson (10) Patent No.: US 8,358,772 B2
(45) Date of Patent: Jan. 22, 2013

(54) MEANS FOR DIRECTING A CALLER THROUGH AN INTERACTIVE VOICE RESPONSE SYSTEM AND OF MAKING USE OF PRERECORDED PRECATEGORIZED SCRIPTS

(76) Inventor: Marion Timpson, Salt Lake City, UT (US)

(*) Notice: Subject to any disclaimer, the term of this patent is extended or adjusted under 35 U.S.C. 154(b) by 323 days.

(21) Appl. No.: 12/861,753

(22) Filed: Aug. 23, 2010

(65) Prior Publication Data

US 2012/0045043 A1    Feb. 23, 2012

(51) Int. Cl.
*H04M 3/00* (2006.01)
*H04M 1/64* (2006.01)
(52) U.S. Cl. .................. 379/265.02; 379/88.23
(58) Field of Classification Search .... 379/88.01–88.23, 379/265.01–266.01; 455/426.2
See application file for complete search history.

(56) References Cited

U.S. PATENT DOCUMENTS

| | | | | |
|---|---|---|---|---|
| 6,643,622 B2* | 11/2003 | Stuart et al. | ................ | 704/275 |
| 6,829,603 B1* | 12/2004 | Chai et al. | ................ | 1/1 |
| 6,981,256 B2* | 12/2005 | Jawahar et al. | ................ | 718/101 |
| 2003/0179876 A1* | 9/2003 | Fox et al. | ................ | 379/265.02 |
| 2005/0047394 A1* | 3/2005 | Hodson et al. | ................ | 370/352 |
| 2005/0213743 A1* | 9/2005 | Huet et al. | ................ | 379/265.09 |

* cited by examiner

*Primary Examiner* — Mohammad Islam
(74) *Attorney, Agent, or Firm* — Steven Rinehart (57) ABSTRACT

An apparatus, computer program product, method and system are disclosed for manually guiding inbound callers through an IVR system, then sequentially playing prerecorded, precategorized scripts, or audio dialogs, to the caller in accordance with the steps of a sales method governing the categorization of the scripts. Certain embodiments of the present invention include substitute means of collecting, conferencing, routing, and managing inbound callers in and out of IVR platforms.

24 Claims, 5 Drawing Sheets

MEANS FOR DIRECTING A CALLER THROUGH AN INTERACTIVE VOICE RESPONSE SYSTEM AND OF MAKING USE OF PRERECORDED PRECATEGORIZED SCRIPTS

BACKGROUND OF THE INVENTION

1. Field of the Invention

This invention relates to interactive voice response (IVR) technologies, and more particularly relates to an apparatus, computer program product and data processing system for covertly guiding a caller through an IVR system.

2. Description of the Related Art

Business processing outsource (BPO) service provides are commercial organizations which run call centers that manage inbound and outbound telephone sales campaigns for their clients. BPO service providers have been quick to incorporate developing technological advances into their business models, including increasingly sophisticated Interactive Voice Response (IVR) technologies, which recognize verbal and keypad input from callers.

Sales teams at inbound BPO call centers are able to rely on IVR technology to collect a great deal of information from, and about, inbound callers before routing those inbound callers to live operators. IVR technologies enable customers, and potential customers, of retail business to navigate databases verbally or through the touchpad of the telephone. Through IVR systems, potential customers are able to interface with a computer that prompts callers to enter information and provides voice based-feedback. Callers to IVR systems interact with a voice browser by listening to audio output that is either pre-recorded or computer-synthesized. Callers submit audio input to the IVR system in the form of natural voice communication or DTMF keypad input.

In modern BPO business models, inbound sales representatives are required to attend to an increasingly number of incoming calls over the telephone, which calls IVR platforms help them manage. IVR technology has drastically increased the efficiency of the BPO industry, and has been used to manage billions of incoming calls across the industry over the years since IVR use became standard in the industry. IVR technology reduces operation costs and at the same time and increases customer satisfaction.

The interfacing features of IVR systems can be configured to direct potential customers through a sequence of simple menus which gather personal information using CTI (Computer Telephony Integration). The capability of the IVR technology to identify and collect personal information from callers makes IVR technology very important to the BPO industry. Call center operators are able to modify their presentation in accordance with personal information gathered by the IVR platform and digitally displayed to the operators.

IVR platforms usually run on Wintel and Cisco equipment, and usually rely on VXML, or VoiceXML, technologies to interact with callers using voice-recognition technology.

VoiceXML is designed for creating audio dialogs that feature synthesized speech and/or digitized audio. These audio dialogs are played to callers in response to IVR recognition of spoken or dual-tone multi-frequency (DTMF) signaling (keypad input). Modern IVR platforms making use of VXML or VoiceXML can be configured to carry on conversations and sales transactions with callers from the point of contact to the point of sale, by playing audio dialogs to callers.

IVR platforms can be further configured to play digitized audio scripts to callers which are so responsive to the natural verbal input of the callers that the callers do not know they are interfacing with a machine. Some embodiments of IVR platforms prompt an operator of the BPO service provider monitoring a call to select from a list of prerecorded scripts to replay to the caller in response to questions asked by the caller.

BPO call centers employing operators with poor English skills, or exotic accents, have found that their operators can reach greater levels of sales efficiency replaying digitized scripts of skilled native English speakers then attempting to interact directly with callers.

Call Control XML (CCXML) interoperates with VXML to manage a plurality of simultaneously incoming calls. CCXML is the W3C standard markup language for controlling how phone calls are placed, answered, transferred, and conferenced. CCXML works in conjunction with VoiceXML to provide standards for telephony application, including support for multi-party conferencing and message-passing.

CCXML imparts the ability to many IVR platforms to give each active line in a voice application its own dedicated VoiceXML interpreter, and the ability to receive events and messages from systems outside of the CCXML or VoiceXML platform. Interaction with an outside call center platform, calls started asynchronously from the VoiceXML platform, and communication between multiple clustered VoiceXML or CCXML platforms all require event interaction from one platform to another. Although IVR systems often make use of the same standards, including VXML and CCXML, there exists no system or computer program product in the industry for interchanging different IVR systems within a single BPO architecture.

SUMMARY OF THE INVENTION

From the foregoing discussion, it should be apparent that a need exists for a system, apparatus and computer program product for directing callers through an IVR system. The present invention has been developed in response to the present state of the art; and, in particular, in response to the problems and needs in the art that have not yet been fully solved by currently available methods, systems and apparatus, and that overcome many or all of the above-discussed shortcomings in the art. Accordingly, the present invention has been developed to provide an apparatus, computer program product, and system for directing a caller through an IVR system.

A system to direct a caller through any IVR system is disclosed, the system comprising: a telephony switching module configured to measure call volume to an inbound call center; an assenter module configured to prompt an operator to join a call channel in response to the call volume measured by the telephony switching module satisfying a predetermined criteria; a joiner module configured to join the operator with the call channel in response to the operator accepting the prompt of the assenter module to join the call channel, the joiner module being configured to allow the operator to exit and rejoin the call channel at will; a switcher module configured to transfer control of DTMF signaling and voice input ("input control") from the call channel to the operator upon command of the operator such that a caller on the call channel is unaware that input control has been transferred, the switcher module configured to transfer input control back to the call channel upon command; and a commercial IVR system with which the call channel interacts.

The system further comprises a control module configured to convey DTMF signals and voice input ("audio input") from the operator to an IVR system such that the IVR system receives the audio input but the audio input is not heard by the call channel; a router module configured to route the call channel to a second operator after IVR data collection, the second operator automatically selected from a plurality of operators by the router module to have a higher likelihood than one or more other operators of closing a commercial transaction, the second operator selected by the router module in accordance with a selection criteria satisfied in part by cross-referencing historical sales data and data collected by the IVR system from the caller.

The system further comprises a point of sale module configured to prompt the second operator to select a recommended digitized audio script for replay on the call channel from one of a plurality of digitized audio scripts exclusively sorted into one of a plurality of closing categories, each closing category corresponding to one of a plurality of predetermined steps of a method of conducting a commercial transaction, wherein the recommended digitized audio script is preselected by the point of sale module to be the most efficient after cross-referencing data collected by the IVR system with historical data.

The system may further comprise an automatic call distributor (ACD) configured to bypass the telephony switcher module in response to an inbound call volume exceeding a predetermined threshold. In some embodiments, the method of closing a commercial transaction comprises the following steps: personally introducing oneself; probing the caller with questions about the caller's needs; delivering an initial value statement that ties back to the caller's needs; delivering an offer to the caller which creates a sense of urgency; and calmly requesting payment information.

In still further embodiments, the assenter module prompts an operator to join a call channel who is available. In further embodiments, the router module routes a plurality of calls to the operator who handles a plurality of calls simultaneously.

In still further embodiments, the plurality of digitized audio scripts comprise audio recordings of portions of dialogue spoken by an operator determined to be effective at closing commercial transactions. The system may also comprise a tracker module configured to track the second operator's progress through the steps of the method of closing a commercial transaction, and configured to instruct the point of sale module which category of digitized audio scripts should be used in prompting the second operator. The system may also comprise a PBX switch.

An apparatus is also disclosed, comprising a database server, processor, and a memory device, which apparatus is configured to perform operations that closely mirror the functions imparted to the system recited above. Additionally, a computer program product to direct callers through an IVR system which comprises modules functionally similar to those of the apparatus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. The apparatus modules recited in the claims may be configured to impart the recited functionality to the apparatus. For the purposes of the present invention, the systems and technologies taught and recited herein are referred to collectively as Intelligent IVR™.

Figure 1:
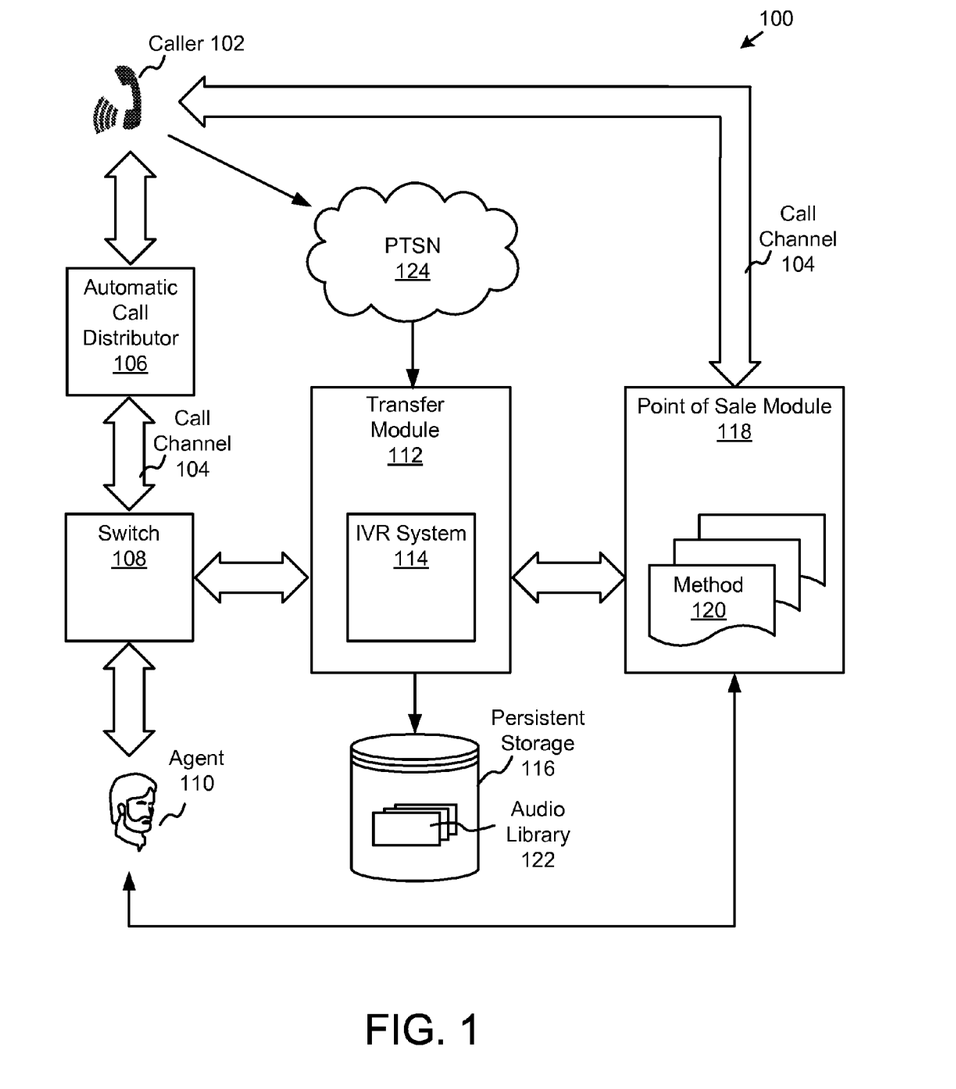
FIG. 1 is an entity-relationship diagram illustrating one embodiment of a system that directs a caller through any IVR system in accordance with the present invention.

FIG. 1 is an entity-relationship diagram illustrating one embodiment of a system 100 that directs a caller through any IVR system in accordance with the present invention. The system 100 comprises a call channel 104, an automatic call distributor (ACD) 106, a switch 108, a transfer module 112, an IVR system 114, persistent storage 116, a point of sale module 118, a method 120, an audio library 122, and a public switched telephone network (PTSN) 124. In the shown embodiment, a caller 102 and operator 110 are interacting with the system 100.

The caller 102 may comprise any person, company or organization that is potentially a customer of another person, company or organization. In the shown embodiment, the caller 102 comprises an individual making an outgoing call routed to the system 100 after being solicited to purchase a commercial product in an infomercial on television.

The system 100 includes one or more operators 110. The operator 110 comprises a human beings employed by business processing outsource (BPO) service provider in the shown embodiment, but may comprise a data processing device (DPD), a third-party company or organization which solicits customers, a computing device configured to perform the functions of human being, or any combination of the above. The operator 110 may comprise a (DPD) configured to solicit callers 102 using prerecorded digitized audio scripts.

The automatic call distributor (ACD) 106 is a device or system that is well-known to those of skill in the art, and which can be configured to distribute calls to the terminal of any operator 110 who becomes available. The ACD 106 in the shown embodiment comprises additional unique functionality. The ACD 106 comprises the switches, hardware, firmware, software and the like necessary to implement routing instructions and/or a routing strategy imposed upon on the ACD 106. In some embodiments of the present invention, a common computing device such as personal computer or server is enabled to perform the functions of the ACD 106. In other embodiments, the ACD 106 forms part of a larger computer telephony integration (CTI) system.

In the shown embodiment, the ACD 106 comprises a computer program running on one or more data processing devices (DPDs), such as a server, computer workstation, router, mainframe computer, or the like. In various embodiments, the DPD comprises one or more processors. The processor is a computing device well-known to those in the art and may include an application-specific integrated circuit ("ASIC").

The call channel 104 comprises any telephonic connection between a caller 102 and system 100. The call channels 104 may comprise inbound telephonic connections initiated by the caller 102, or may comprise outbound telephonic connections initiated by one or more operators 110 acting within, or in association with, the system 100.

In the shown embodiment, the ACD 106 is configured to route calls the switch 108 when one or more operators 110 are available to monitor the communications on the call channel 104 or when call volume to the system 100 exceeds, or fails to exceed, a predetermined threshold.

In the shown embodiment, a plurality of operators 110 are in communication with the system 100. The ACD 106 is in communication with terminals interfacing with the operators 110. When all operators 110 in communication with the system 100 are occupied, the ACD 106 routes incoming call channels 104 directly the IVR 114. If an operator 110 is available to monitor an incoming call channel 104, the ACD 106 prompts the available operator 110 to join the subject call channel 104 by messaging the operator's 110 terminal using chimes, tones and/or via mechanisms well-known to those of skill in the art.

In some embodiments of the present invention, the operator 110 chooses to join the call channel 104. In other embodiments of the present invention, the operator 110 is automatically joined to the call channel 104 by the ACD 106 if the operator 110 is available or not preoccupied with one or more other call channels 104. In various embodiments of the present invention, the call channels 104 in communication with the system 100 comprise exclusively outbound calls, exclusively inbound calls, or a combination of inbound and outbound calls. Thus, the teachings of the present invention may be applied to BPO service providers offering a variety of call related services.

The switch 108 comprises the hardware, software, and/or firmware necessary to allow an operator 110 take communicative control over the call channel 104 from the caller 102. In the shown embodiment, the switch 108 enables the operator 110 to take over voice and DTMF input control from the caller 102 during the period in which the caller 102 is in contact with the IVR 114. Thus, in the system 100, the caller 102 believes that he/she is communicating with the IVR 114; but, in fact, voice and DTMF input from the caller 102 are being exclusively relayed to the operator 110 rather than to the IVR 114, while audio output from the IVR 114 is being relayed to both the caller 102 and the operator 110 via the call channel 104.

In various embodiments of the present invention, the switch 108 may prompt the operator 110 to take communicative control from one or more callers by activating color-coded lights or LEDs. In still further embodiments, the switch 108 may use color-coded lights or LEDs to inform the operator 110 of the status of a call channel 104 routed to the operator 110 (e.g. whether or not the operator 110 has communicative control).

In the shown embodiment, after joining the call channel 104, the switch 108 imparts the ability to the operator 110 to switch on and off the operator's 110 exclusive control of voice and DTMF input with the IVR 114. The operator 110 can monitor the call channel 104 while the switch 108 is switched on or off, and thus the operator 110 can return and take input control from the caller 102 through the pendency of IVR 114 call processing.

The switch 108 provides the caller 102 with no indication, either audio or otherwise, that the operator 110 is switching in and out of the call channel 104 and taking input control from the caller 102. Thus, the caller 102 believes he/she is still communicating with the IVR 114, when in fact the operator 110 is communicating covertly with the IVR 114 on behalf of the caller 102 in response to input the operator 110 receives from the caller 102.

In various embodiments of the present invention, the operator 110 communicates with the IVR 114 using a different methodology than that which the caller 102 uses to communicate unknowingly with the operator 110. For instance, the caller 102 may communicate input to the operator 102 using DTMF signaling, while the operator 110 subsequently relays that caller 102 input to the IVR 114 using variations of the Simple Mail Transfer Protocol (SMTP), Internet Message Access Protocol (IMAP), Post Office Protocol (POP), or other computer-to-computer protocols well-known to those of skill in the art. The operator 110 may additionally and/or alternatively relay the caller 102 input to the IVR 114 using human-to-computer protocols well-known to those of skill in the art, including instant messaging and the like.

This functionality imparted to the operator 110 by the switching module 108 improves the efficiency of inbound call centers by allowing operators 110 who are more familiar with the telephony menus of IVRs to correctly navigate the menus and make use of inputs calculating to meet callers' 102 needs and desires without the fear of computer recognition error.

Many IVRs are commercially available, including PACER, Prosodie®, and the like. The interactive voice response (IVR) 114 detects voice and dual-tone multi-frequency (DTMF) signaling from callers 102. In some variations, the IVR 114 interacts with the callers 102 using prerecorded and/or dynamically generated audio messages to lead a caller 102 through simple telephony menus. Voice and DTMF signals are communicated to the IVRs vis-à-vis the call channel 104, but said DTMF and voice signals do not necessarily originate with the caller 102, and may originate with the operator 110. As previously set forth, at the option of the operator 110, outbound communicative call control is covertly stripped from the caller 102 and transferred to the operator 110.

The interfacing features of the IVR 114 can be configured to direct a caller 102 through a sequence of simple menus which gather personal information using CTI (Computer Telephony Integration). The personal information may comprise name, age, ethnicity, economic status, native language, residence information, purchasing preferences, and the like. The personal information may be stored in database format in the persistent storage 116.

The IVR 114 can be configured to transfer call channels 104 to suitable operators 110 in response to the personal information gathered from a caller 102 meeting certain predefined transfer criteria, including to operators statistically shown to have a higher likelihood of closing a sale with a particular type of caller, such as a caller of a certain ethnicity.

In some embodiments, the operator 110 guiding the caller 102 through the IVR 114 may be in communication with a second operator 110 to whom the caller 102 will be routed after IVR processing using variations of the Simple Mail Transfer Protocol (SMTP), Internet Message Access Protocol (IMAP), Post Office Protocol (POP), or other protocols well-known to those of skill in the art.

In some embodiments, the operator 110 guiding the caller 102 through the IVR 112 may be assigned a unique identifier used to track the operator's 110 average time on a call, call efficiency as function of average time spent, average rate of closing sales, average number of incidental upsales made as measured by the dollar value of the upsales or gross number of incidental upsales, or success in keeping callers 102 and/or call channels 104 progressing through a predetermined sales method. Statistics relevant to tracking the operator's 110 performance over time are uniquely associated with the operator's 110 unique identifier and stored in non-volatile storage, or persistent storage 116, for review by administrative authorities at later dates.

In this embodiment, the IVR 114 communicates personal information gathered from the caller 102 electronically to the operator 110 using variations of common protocols well known to those of skill in the art and using computer-supported telecommunications applications (CTSA). In other embodiments, contact information 116 is distributed the operator 110 over a local area network (LAN) or wide area network (WAN), or the Internet 104.

The ACD 106 may route call channels 104 to any DPD, device, person, company, operator 110, second caller, organization, or the like in communication with the maintenance server 102, including the operator 110. The operator's 110 telephone and communicative apparatus may be internal or external to the system 110.

The persistent storage 116 provides persistent storage of data. In particular, the persistent storage 109 stores computer readable database files, including a library of prerecorded digitized scripts, i.e. an audio library 122. In the shown embodiment, the audio library 122 comprises a plurality of playable, digitized, prerecorded audio scripts in computer readable files transmittable over a signal bearing medium. In the shown embodiment, the prerecorded digitized clues are stored in database format, and are categorized into one of a plurality of sales method steps.

The persistent storage 116 may also store historical measurements of operator 100 efficiency, including the ratio or percentage of sales made per total call volume routed to the operator, gross sales revenue, average sale amount, and one or more operators' 100 sales per total calls originated from a geographic area.

Some embodiments of the system 100 may comprise various call switching technologies such as a public switched telephone network (PTSN) 124, providing means of seamlessly routing incoming calls 104 originating in a variety of countries to the IVR 114 or to the transfer module 112. In other embodiments, the PTSN 124 routes calls to the ACD 106.

After a caller 102 has interacted with the IVR 114 with the assistance of the operator 110, and the IVR 114 has collected personal information from the caller 102, the transfer module 112 routes the call channel 104 to the point of sale module 118 for further call processing. In some embodiments of the present invention, the caller 102 is transferred directly to the point of sale module 118 before personal information is gathered by the IVR 114.

In some embodiments, the transfer module 112 is optimized to automatically analyze historical sales data and/or an operator's 100 time on the job in a present shift to determine whether the operator 110 has become fatigued so as to maximize profits by routing call channels 102 to non-fatigued operators.

The transfer module 112 may comprise a relational computer database managed by a relational database management system (RDBMS) or a database management system (DBMS), such as Oracle, DB2, Firebird, SQL, or other DBMSs as well-known to those of skill in the art.

In still further embodiments, the transfer module 112 is configured to recognize the area code and/or geographic location from which a call channel 104 originated, and to route that call channel 104 to an operator 110 determined from historical analysis to share the socio-economic, ethnic, linguistic or cultural identity of the caller 102.

The point of sale module 118 interconnects the caller 102 with an operator 110. The operator 110 may be the same operator 110 who originally covertly guided the caller 102 through the IVR 114, or a second operator 114.

The point of sale module 118 prompts the operator 110 interconnected with the caller 102 to pick one of a variety of prerecorded digital audio scripts saved collectively in the audio library 122 in persistent storage to play over the call channel 104 to the caller 102.

The prerecorded digital audio scripts ("audio scripts") are categorized into one of a plurality of categories exclusively associated with one of a plurality of steps of a method 120 of closing a sale. There are many methods of closing sales of consumer goods known in the industry, and the present invention may be configured to store audio scripts exclusively associated with the steps of any of these methods.

The steps of the method 120 are stored in volatile computer readable memory, such as RAM, in the point of sale module 118. In some embodiments of the present invention, the steps of the method 120 are stored in persistent storage 116 and transferred into Flash memory accessible by the point of sale module 118.

The audio scripts comprise recordings of select snippets of conversations that operators 110, who are adept at implemented the steps of the method 120, have had on previous occasions with one or more callers 102. In the some embodiments of the present invention, a textualized transcript of the audio recording is stored in persistent storage 116 in the audio library 122. The textualized transcripts may be translated into a variety of languages known the second operator 110 guiding the caller 102 through the steps of the method 120, and displayed to the second operator 110 on a display such that the second operator 110 may choose which of a plurality of audio scripts to play from the audio library 120 to the caller 102 in response to questions and comments made by the caller 102 over the call channel 104.

In accordance with the teachings of the present invention, the second operator 110 may orally guide a caller 102 through the purchase of a consumer good using entirely selected audio scripts comprising the voice of another operator 110 such that the caller 102 is tricked into believing that he/she is communicating in real time with the second operator 110.

Thus, the present invention overcomes problems in the prior art by, inter alia, allowing the second operator 110 to communicate without disabilities stemming from an accent that the second operator 110 may have, and even to allow the second operator 110 to communicate in languages unknown to the second operator 110 using the audio scripts.

The point of sale module 118 is configured to sequentially guide the second operator 110 through the steps of the method 120 by displaying the textualized transcripts of only those audio scripts categorized into the step of the method 120 in which the caller 102 and second operator 110 are currently engaged. Once at least one audio script has been played for each step of the method 120 to the caller 102, the point of sale module 118 advances the second operator 110 through the method 120 by displaying audio scripts associated with the next subsequent step in the method 120.

The point of sale module 118, in some embodiments, may advance the method 120 to a subsequent step in response to input from the second operator 110 that the method 120 should be advanced. Alcoholics Referring now to FIG. 2, an entity-relationship diagram illustrating another embodiment of a system 200 that directs a caller through any IVR system in accordance with the present invention. The system 200 comprises a computer program product 202, an outgoing call channel 202, an incoming call channel 204, displays 206a-c, a voice input 208, a DTMF input 210, audio scripts 212a-c, and payment info 214. Callers 102a-c and operators 110a-c are interacting with the CPP 202 and system 200.

Figure 2:
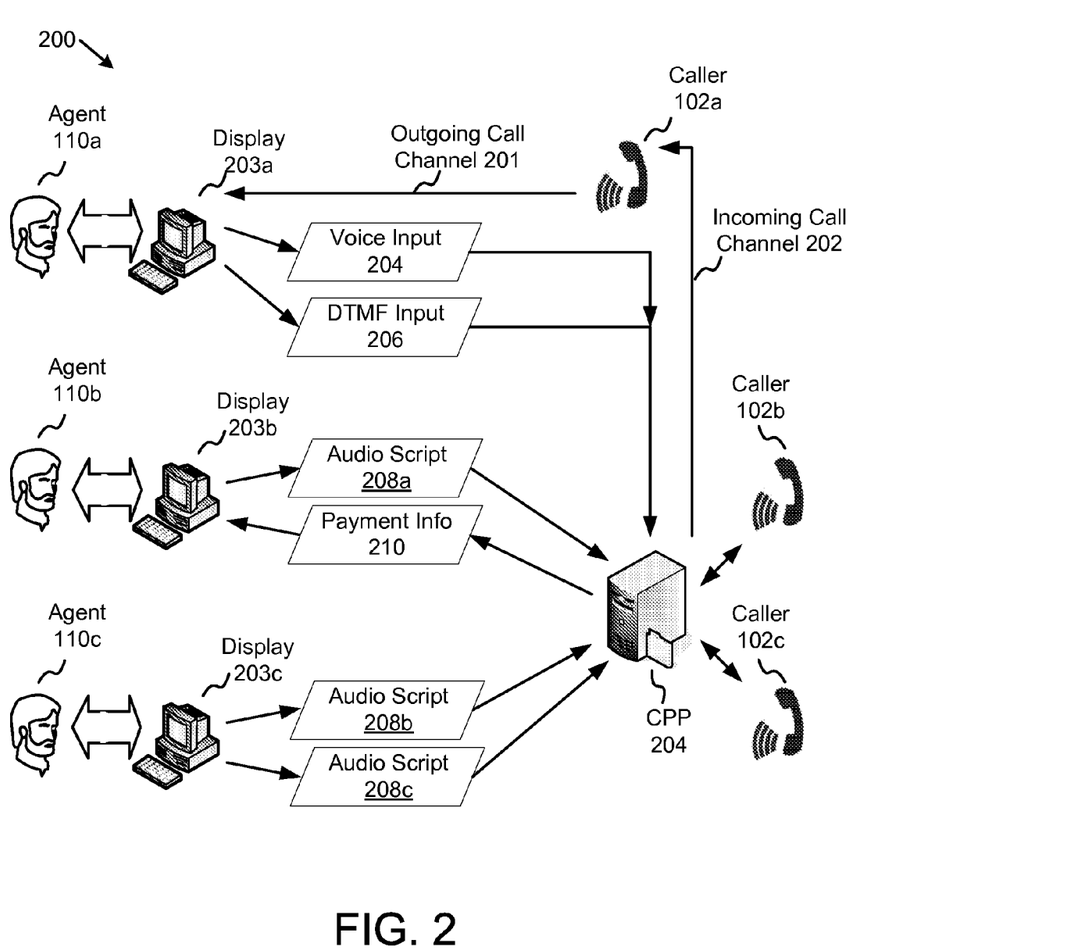
FIG. 2 is an entity-relationship diagram illustrating one embodiment of a system that directs a caller through any IVR system in accordance with the present invention.

The outgoing call channel 202 comprises the audio signal relayed from the caller 102a to the operator 110a after the operator 110a has take input control from the caller 102a.

The incoming call channel 204 comprises the audio signal relayed from the system 200 to the caller 102a.

The operator 110a receives the audio sent via the outgoing call channel 202, and sends voice input 208 and/or DTMF 210 of the operator's 110 own the CPP 202 which comprises the IVR 114.

The displays 206a-c comprise computer displays well-known to those of skill in the art, and may comprise liquid crystal displays (LCD), plasma displays, cathode ray, projectors, and the like.

The voice input 208 comprises spoken audio by the operator 110a. The DTMF 210 comprises dual-tone multi-frequency (DTMF) signaling on a telephone keypad by the operator 110a.

The audio scripts 212a-c are substantially described above in relation to FIG. 1.

The payment info 214 comprises payment information given by the caller 102 to an operator 110, including bank routing numbers, and/or checking account numbers, and/or credit card numbers, and/or expiration dates, and/or PayPal® account information, and/or credit information, and the like.

Figure 3:
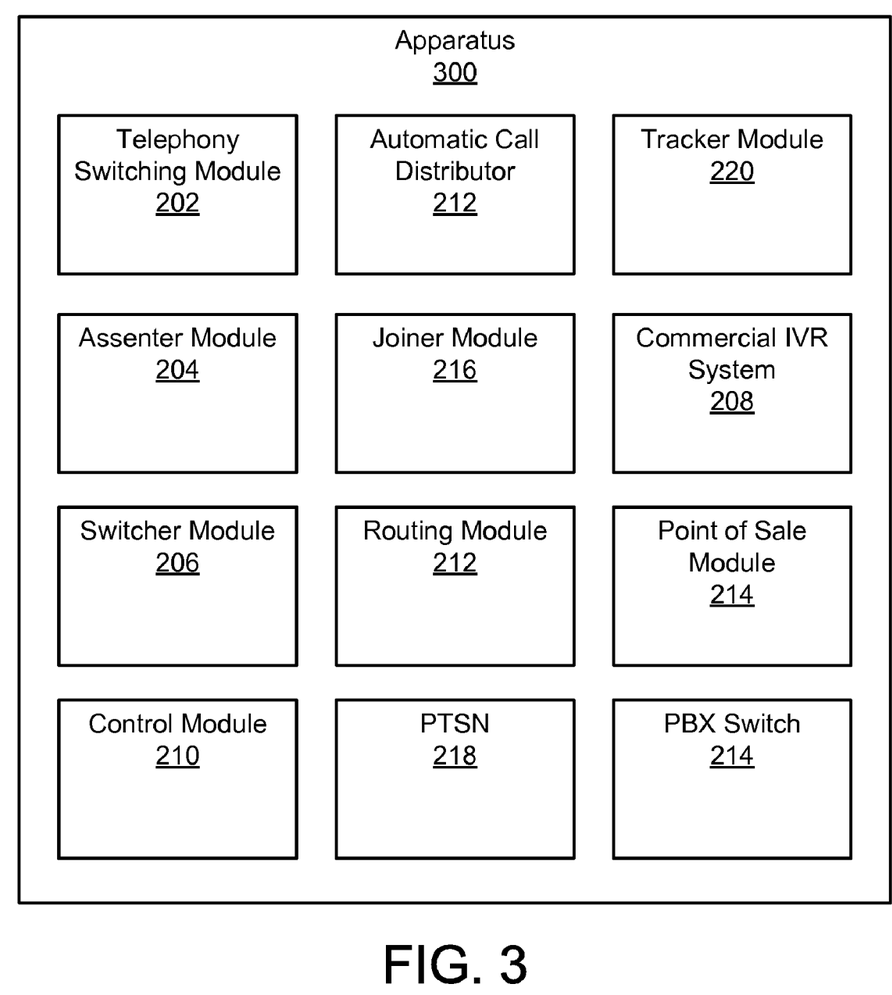
FIG. 3 is a block diagram illustrating another embodiment of an apparatus for directing a caller through any IVR system in accordance with the present invention.

Referring now to FIG. 3, a block diagram illustrating an apparatus 300 for directing a caller through any IVR system in accordance with the present invention. The apparatus 300 comprises an ACD 106, an IVR 114, a persistent storage 116, a telephony switching module 302, an assentor module 304, a switcher module 306, a control module 310, a router module 312, a point of sale module 118, a PBX switch 322, a PTSN 124, and a tracker module 320.

The ACD 106 is substantially described above in relation to FIGS. 1-2.

The IVR 114 is substantially described above in relation to FIGS. 1-2.

The persistent storage 116 is substantially described above in relation to FIGS. 1-2.

The telephony switching module 302 measures call volume and routes calls

The assentor module 304 is configured to prompt an operator 110 to join a call channel 204 in response to the call volume measured by the telephony switching module 302 satisfying a predetermined criteria. In some embodiments, the operator 110 assents to the prompt to join the call channel 204 by depressing a key marked with a numeral on a standard computer keyboard. In some embodiments, the predetermined criteria is predetermined by one or more DPDs.

The switcher module 306 is configured to transfer control of DTMF signaling and voice input ("input control") from the call channel 204 to the operator 110 upon command of the operator 110 such that a caller on the call channel is unaware that input control has been transferred, the switcher module configured to transfer input control back to the call channel upon command.

The control module 210 is configured to convey DTMF signals and voice input ("audio input") from the operator 110 to an IVR 114 such that the IVR 114 receives the DTMF input 210 and voice input 208 such that neither the DTMF input 210 or voice input 208 is not heard by caller 102 on the call channel 104.

In some embodiments of the present invention, the IVR 114 comprises a uniquely configured IVR system which is preprogrammed to recognize keywords spoken by the caller 102 and/or the operator 110, and to then make assumptions about non-recognized oral communications of the caller 102. The IVR 114, in this unique embodiment, is configured to recognize keywords indicative of a caller 102 need, intent, or instruction. In some embodiments, the IVR 114 is additionally configured to recognize keywords indicative of personal information of the caller 102.

For instance, the IVR 114 may be configured to recognize: keywords denoting the names of products the caller 102 wishes to purchase such as "silverware"; keywords denoting the city, state, country or continent where the caller 102 resides such as "San Diego"; keywords denoting an affirmative or negative response to a yes or no questions posed to the caller 102 by the IVR 114 or the operator 110 such as "yes," "no," and "yep"; keywords indicating a state of mind such "fine" or "good"; and keywords manifesting a desire, such as "need," "want" or "wish."

In some embodiments of the present invention, the IVR 114 is configured to recognize keywords spoken in a plurality of languages, such as English, Spanish, or Chinese. In other embodiments of the present invention, the IVR 114 may be switched from one mode to either, which each mode configured to recognize a finite number of keywords in a particular language exclusively associated with that mode. This mode switching functionality provides efficiency to IVR 114 systems handling calls for a variety of consumer products from a variety of callers 102 speaking multiple languages or having multiple accents.

In still further embodiments of the present invention, the IVR 114 may be configured to recognize short phrases, such as "I don't think so," "I would like" or "Yo no ablo Ingles."

Upon recognition of one or more keywords, the IVR 114 may recommend that the operator 110 play one or more prerecorded digital scripts 212 to the caller 102, which prerecorded digital scripts are associated by the IVR 114 with one or more of the recognized keywords. Prerecorded digital scripts 212 that have already been played to the caller 102 are not included by the IVR 114 in the list of recommendations, and the IVR 114 prioritizes, in some embodiments, the recommendations using an efficiency rating. Prerecorded scripts 212 that are calculated to progress the caller 102 in the conversation toward conclusion or a commercial sale may have higher efficiency ratings that prerecorded digital scripts 212 calculated only to be responsive to the caller 102 communication at hand.

The router module 212 is configured to route the call channel 104 to a second operator 110 after IVR data collection, the second operator 110 automatically selected from a plurality of operators by the router module 212 to have a higher likelihood than one or more other operators of closing a commercial transaction, the second operator 110 selected by the router module 212 in accordance with a selection criteria satisfied in part by cross-referencing historical sales data and data collected by the IVR 114 from the caller 102.

The point of sale module 118 is described above in relation to FIGS. 1-2. The point of sale module 118 is configured to prompt the second operator 11—to select a recommended digitized audio script 212 for replay on the call channel 104 from one of a plurality of digitized audio scripts 122 exclusively sorted into one of a plurality of closing categories, each closing category corresponding to one of a plurality of predetermined steps of a method of closing a commercial transaction, wherein the recommended digitized audio script 212 is preselected by the point of sale module 118 to be the most efficient after cross-referencing data collected by the IVR 114 with historical data.

The PBX switch 222 is well-known to those of skill in the art.

The PTSN 124 is substantially described above in relation to FIGS. 1-2, and known to those of skill in the art.

The tracker module 220 is configured to track the second operator's 110 progress through the steps of the method of closing a commercial transaction, and configured to instruct the point of sale 118 module which category of digitized audio scripts should be used in prompting the second operator 110.

Figure 4:
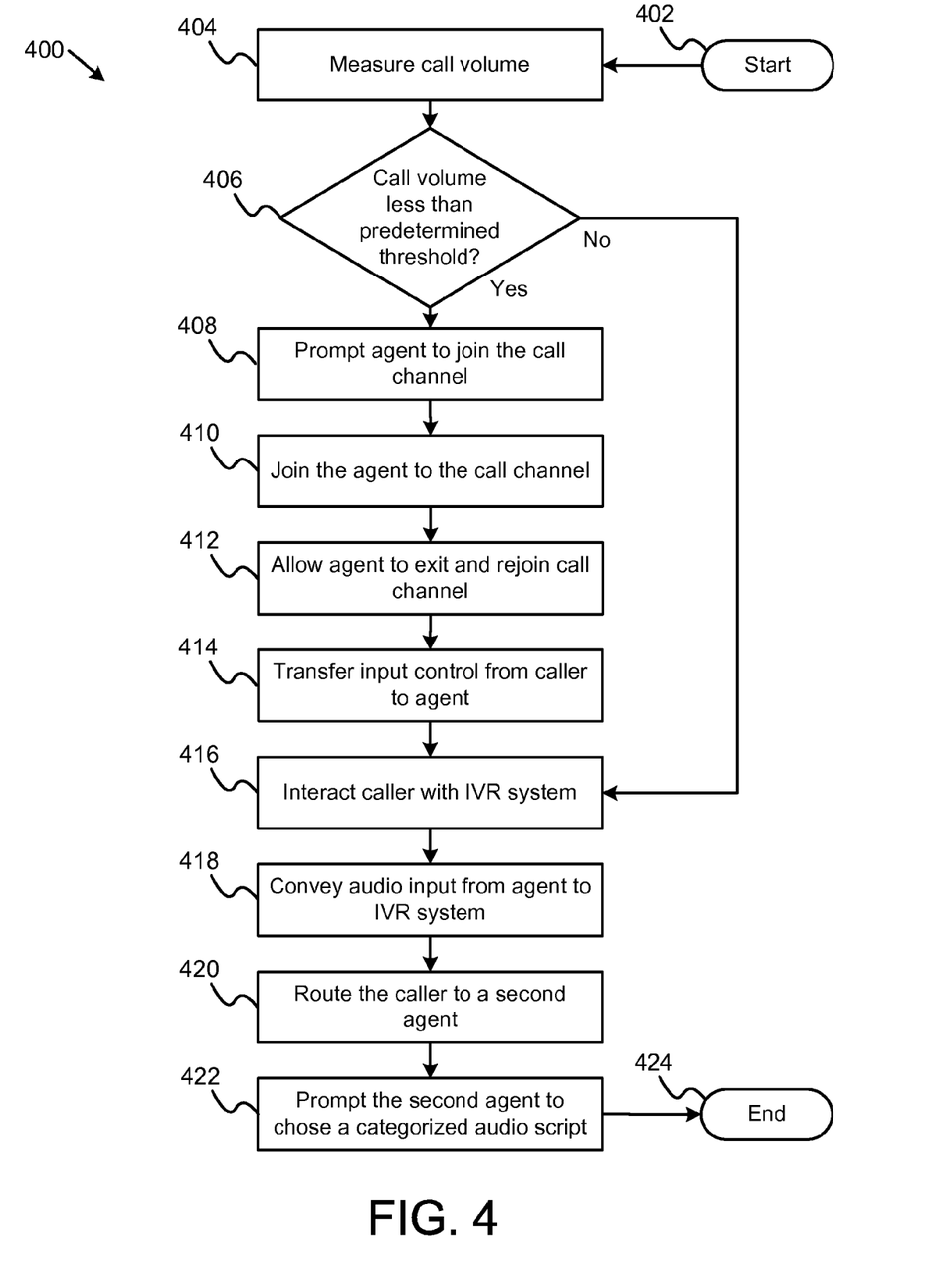
FIG. 4 is a flow chart of a method of directing a caller through any IVR system in accordance with the present invention.

Referring now to FIG. 4, a flow chart of a method 400 of directing a caller through any IVR system in accordance with the present invention. The method 400 substantially includes the embodiments and modules described above with regard to the apparatus, computer program product, and system depicted in FIGS. 1-3.

The method 400 begins with a measurement module measuring 404 the call volume, or number of incoming calls, to a BPO service provider. If, at 406, the call volume does not exceed a predetermined threshold, an operator 110 is prompted 408 to join the call channel 104.

The method 500 proceeds, and the operator 110 is allowed 412 to exit and rejoin the call channel 104. Input control is transferred 414 from the caller 102 to the operator 110, meaning that any audio or DTMF input that the caller 102 attempts to make to the IVR 114 is exclusively directed to the operator 110 instead, and the operator 110 assumes the place of the caller 102 for the purpose of inputting audio information to the IVR 114.

After assuming 414 input control, the operator 110 interacts 416 with the IVR 114 and then conveys 418 audio input to the IVR 114. The operator 110 then routes 420 the caller 102, in some embodiments, to a second operator 110 who is prompted 422 to join the call channel 104.

If, at 424, there are unexecuted steps in a sales method, the second operator 110 is continuously prompted 426 to select digitized audio scripts 212 exclusively associated with the next subsequent unexecuted step in the sales method until there remain no more unexecuted steps. After each digitized audio script 212 is played in accordance with the sales method, the second operator 110 awaits 428 a response from the caller 102. The audio library 122, in the preferred embodiment, archives a sufficient number of digitized scripts 212 so as to provide the second operator 110 with answers and responses to almost every logically conceivable caller 102 response to any digitized script 212. In the event that a caller 102 gives 430 a non-typical response to a digitized script 212, the second operator 110 transfers 432 the caller 102 to a third operator who has previously demonstrated better proficiency with the caller's 102 native language than the second operator 110, or who has demonstrated better a better ability to close sales of consumer products or services. In some embodiments, the caller 102 plays an exit script before transferring 432 the caller 102, informing the caller 102 that the second operator's 110 supervisor needs to speak with the caller 102 or take control of the call channel 104.

In the event that, at 424, there are no more unexecuted steps in the sales method, the second operator 110 closes 434 the call with the caller 102 by playing one or more digitized scripts associated with call termination, such as digitized scripts 212 comprising farewells or thanks.

Finally, caller information gleaned by the IVR 114 is written into persistent storage 116 for future reference.

Figure 5:
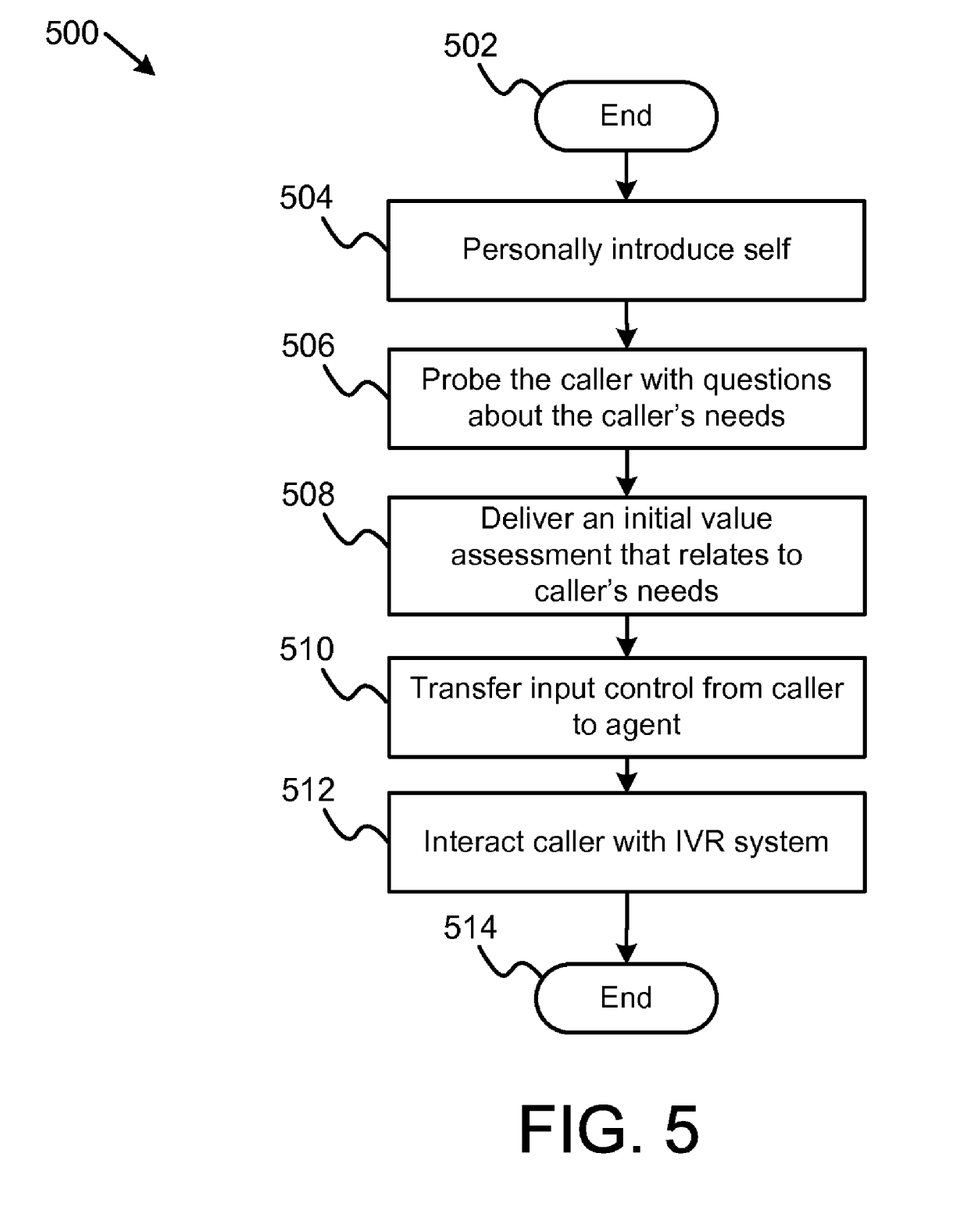
FIG. 5 is a flow chart of a method of closing a commercial transaction in accordance with the present invention.

Referring now to FIG. 5, a flow chart of a method 500 of closing a commercial transaction in accordance with the present invention.

The method 500 begins 502 when a call channel 104 is transferred to the second operator 110 who personally introduces 504 himself the caller 102. In some embodiments of the present invention, the second operator 110 personally introduces himself 504 by playing one or more prerecorded, digitized scripts 212 to the caller 104, which digitized scripts 212 are categorized into a single category exclusively associated with step 504 of the method 500. The digitized scripts 212 associated with step 504 may comprise statements about the second operator's 110 background, education, likes, dislikes, time on the job, and the like. The digitized scripts 212 may also comprise questions about the caller's 102 likes, dislikes, background, weather, family, income, how the caller 102 learned the phone number the caller 102 dialed to reach the second operator 110, and the like.

The method 500 proceeds when the second operator 110 probes 506 the caller 102 with questions about the caller's 102 needs. In step 506, the second operator 110 picks digitized scripts 212 from a second group, or category, of digitized scripts exclusively associated with step 506 of method 500. The digitized scripts 212 associated with step 506 may comprise questions about products the caller 102 likes, needs or prefers, questions about the caller's 102, daily activities, and the like.

The method 500 proceeds when the caller 102 delivers 508 an initial value statement that ties back to the caller's 102 needs. As before, the second operator 110 may present an initial value statement to the caller 102 using digitized scripts 212 exclusively associated with this step of the method 500 (step 508). The digitized scripts 212 may comprise prerecorded statements about the quality, durability, utility, price, efficiency, speed, weight, fitness, or size of a consumer product which the second operator 110 is attempting to sell to the caller 102.

The method 500 proceeds when the second operator 110 calmly requests 510 payment information from the caller 102. As with previous steps of the method 500, the second operator 110 may calmly request the payment information from the caller 102 using digitized scripts 212 exclusively associated with this step of the method 500 (step 510). The digitized scripts 212 may comprise prerecorded statements requesting credit card information, checking account information, billing address information, and/or PayPal® information, and/or the like.

In the final step of the Plus One Method™, a commercial transaction is consummated when the caller 102 remits money to the second operator 110 via means well-known to those of skill in the art, including PayPal®, credit card credit, debit card, eCheck, direct bank deposits, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to direct a caller through any IVR system, the system comprising:
   a telephony switching module configured to measure call volume to an inbound call center;
   an assenter module configured to prompt an operator to join a call channel in response to the call volume measured by the telephony switching module satisfying a predetermined criteria;
   a joiner module configured to join the operator with the call channel in response to the operator accepting the prompt of the assenter module to join the call channel, the joiner module being configured to allow the operator to exit and rejoin the call channel at will;
   a switcher module configured to transfer input control from the call channel to the operator upon command of the operator such that a caller on the call channel is unaware that input control has been transferred, the switcher module configured to transfer input control back to the call channel upon command;
   a commercial IVR system with which the call channel interacts;
   a control module configured to convey audio input from the operator to an IVR system such that the IVR system receives the audio input but the audio input is not heard by the call channel; and
   a point of sale module configured to prompt a second operator to select a recommended digitized audio script for replay on the call channel from one of a plurality of digitized audio scripts exclusively sorted into one of a plurality of closing categories, each closing category corresponding to one of a plurality of predetermined steps of a method of closing a commercial transaction, wherein the recommended digitized audio script is preselected by the point of sale module to be the most efficient after cross-referencing data collected by the IVR system with historical data.

2. The system of claim 1, further comprising a router module configured to route the call channel to a second operator after IVR data collection, the second operator automatically selected from a plurality of operators by the router module to have a higher likelihood than one or more other operators of closing a commercial transaction, the second operator selected by the router module in accordance with a selection criteria satisfied in part by cross-referencing historical sales data and data collected by the IVR system from the caller.

3. The system of claim 1, further comprising an automatic call distributor (ACD) configured to bypass the telephony switcher module in response to an inbound call volume exceeding a predetermined threshold.

4. The system of claim 1, wherein the method of closing a commercial transaction comprising the following steps:
   personally introducing oneself;
   probing the caller with questions about the caller's needs;
   delivering an initial value statement that ties back to the caller's needs;
   delivering an offer to the caller which creates a sense of urgency; and
   calmly requesting one or more of payment information, shipping information, and contact information.

5. The system of claim 1, wherein the assenter module prompts an operator to join a call channel who is available.

6. The system of claim 1, wherein the router module routes a plurality of calls to the operator who handles a plurality of calls simultaneously.

7. The system of claim 1, wherein the plurality of digitized audio scripts comprise audio recordings of portions of dialogue spoken by an operator determined to be effective at closing commercial transactions.

8. The system of claim 1, further comprising a tracker module configured to track the second operator's progress through the steps of the method of closing a commercial transaction, and configured to instruct the point of sale module which category of digitized audio scripts should be used in prompting the second operator.

9. The system of claim 1, further comprising a PBX switch.

10. An apparatus configured to direct a caller through any IVR system, the apparatus comprising:
    a telephony switching module configured to measure call volume to an inbound call center;
    an assenter module configured to prompt an operator to join a call channel in response to the call volume measured by the telephony switching module satisfying a predetermined criteria;
    a joiner module configured to join the operator with the call channel in response to the operator accepting the prompt of the assenter module to join the call channel, the joiner module being configured to allow the operator to exit and rejoin the call channel at will;
    a switcher module configured to transfer control of DTMF signaling and voice input ("input control") from the call channel to the operator upon command of the operator such that a caller on the call channel is unaware that input control has been transferred, the switcher module configured to transfer input control back to the call channel upon command;
    a commercial IVR system with which the call channel interacts;
    a control module configured to convey DTMF signals and voice input ("audio input") from the operator to an IVR system such that the IVR system receives the audio input but the audio input is not heard by the call channel;
    a router module configured to route the call channel to a second operator after IVR data collection, the second operator automatically selected from a plurality of operators by the router module to have a higher likelihood than one or more other operators of closing a commercial transaction, the second operator selected by the router module in accordance with a selection criteria satisfied in part by cross-referencing historical sales data and data collected by the IVR system from the caller; and a point of sale module configured to prompt the second operator to select a recommended digitized audio script for replay on the call channel from one of a plurality of digitized audio scripts exclusively sorted into one of a plurality of closing categories, each closing category corresponding to one of a plurality of predetermined steps of a method of conducting a commercial transaction, wherein the recommended digitized audio script is preselected by the point of sale module to be the most efficient after cross-referencing data collected by the IVR system with historical data.

11. The apparatus of claim 9, further comprising an automatic call distributor (ACD) configured to bypass the telephony switching module in response to an inbound call volume exceeding a predetermined threshold.

12. The apparatus of claim 9, wherein the method of closing a commercial transaction comprising the following steps:
personally introducing oneself;
probing the caller with questions about the caller's needs;
delivering an initial value statement that ties back to the caller's needs;
delivering an offer to the caller which creates a sense of urgency; and
calmly requesting payment information.

13. The apparatus of claim 9, wherein the assenter module prompts an operator to join a call channel who is available.

14. The apparatus of claim 9, wherein the router module routes a plurality of calls to the operator who handles a plurality of calls simultaneously.

15. The apparatus of claim 9, wherein the plurality of digitized audio scripts comprise audio recordings of portions of dialogue spoken by an operator determined to be effective at closing commercial transactions.

16. The apparatus of claim 9, further comprising a tracker module configured to track the second operator's progress through the steps of the method of closing a commercial transaction, and configured to instruct the point of sale module which category of digitized audio scripts should be used in prompting the second operator.

17. A computer program product comprising a non-transitory computer readable medium having computer usable program code executable to direct a caller through any IVR system, the operations of the computer program product comprising:
measuring call volume to an inbound call center;
prompting an operator to join a call channel in response to the measured call volume satisfying a predetermined criteria;
joining the operator with the call channel in response to the operator accepting the prompting of the computer program product to join the call channel;
allowing the operator to exit and rejoin the call channel at will;
transferring control of DTMF signaling and voice input ("input control") from the call channel to the operator upon command of the operator such that a caller on the call channel is unaware that input control has been transferred,
transferring input control back to the call channel upon command;
interacting with a commercial IVR system;
conveying DTMF signals and voice input ("audio input") from the operator to an IVR system such that the IVR system receives the audio input but the audio input is not heard by the call channel;
routing the call channel to a second operator after IVR data collection, the second operator automatically selected from a plurality of operators to have a higher likelihood than one or more other operators of closing a commercial transaction, the second operator selected in accordance with a selection criteria satisfied in part by cross-referencing historical sales data and data collected by the IVR system from the caller; and
prompting the second operator to select a recommended digitized audio script for replay on the call channel from one of a plurality of digitized audio scripts exclusively sorted into one of a plurality of closing categories, each closing category corresponding to one of a plurality of predetermined steps of a method of conducting a commercial transaction, wherein the recommended digitized audio script is preselected to be the most efficient after cross-referencing data collected by the IVR system with historical data.

18. The computer program product of claim 16, further comprising an automatic call distributor (ACD) configured to bypass the telephony switching module in response to an inbound call volume exceeding a predetermined threshold.

19. The computer program product of claim 17, wherein the method of closing a commercial transaction comprising the following steps:
personally introducing oneself;
probing the caller with questions about the caller's needs;
delivering an initial value statement that ties back to the caller's needs;
delivering an offer to the caller which creates a sense of urgency; and
calmly requesting payment information.

20. The computer program product of claim 17, wherein the assenter module prompts an operator to join a call channel who is available.

21. The computer program product of claim 17, wherein the router module routes a plurality of calls to the operator who handles a plurality of calls simultaneously.

22. The computer program product of claim 17, wherein the plurality of digitized audio scripts comprise audio recordings of portions of dialogue spoken by an operator determined to be effective at closing commercial transactions.

23. The computer program product of claim 17, further comprising a tracker module configured to track the second operator's progress through the steps of the method of closing a commercial transaction, and configured to instruct the point of sale module which category of digitized audio scripts should be used in prompting the second operator.

24. The computer program product of claim 17, wherein the IVR system is configured during IVR data collection to:
recognize one or more predetermined keywords spoken by the caller over the call channel;
prompt the operator to play one or more digitized scripts predetermined to be responsive to the a caller communication made on the call channel, which digitized scripts are previously unheard by the caller, which digitized scripts are prioritized in accordance with an efficiency rating;
play a prerecorded script selected by the operator from the recommendations; and
save in persistent storage a record that the prerecorded script was played by the operator and instructional information denoted by the recognized keywords.

* * * * *